Feb. 13, 1962          F. L. KUREK          3,020,685
PROCESS AND APPARATUS FOR FILLING PRESSURE TIGHT CANS
Filed Nov. 15, 1957
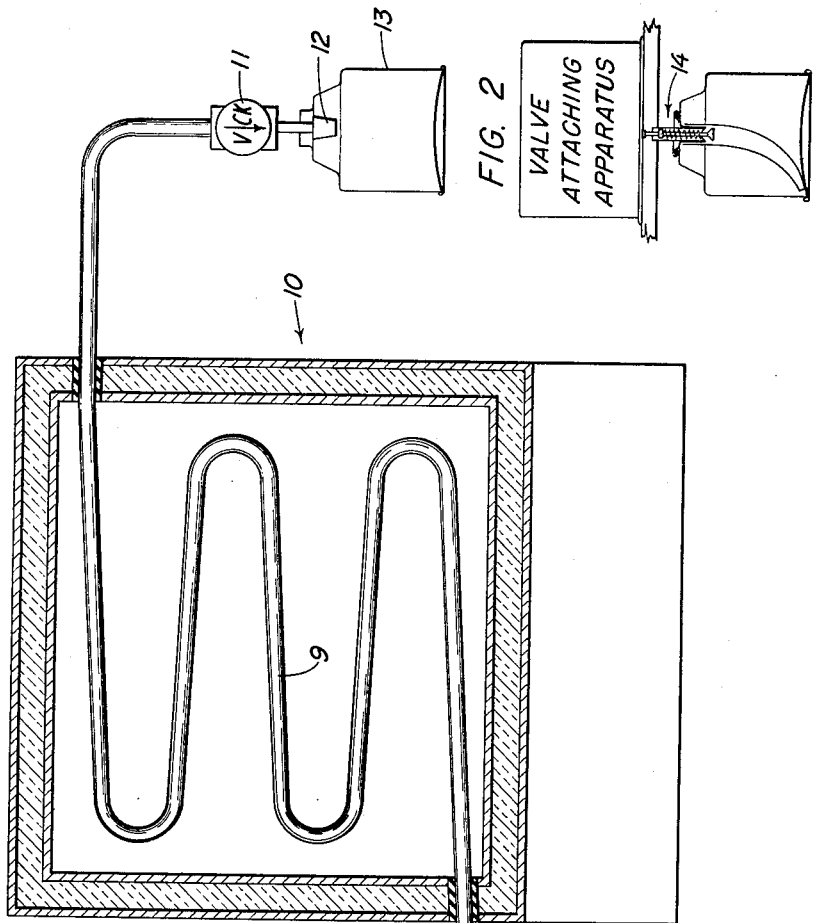
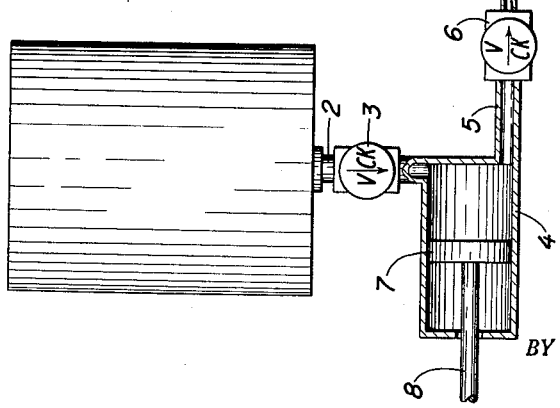
*INVENTOR.*
FRANK L. KUREK
BY
*Attorney*

United States Patent Office 3,020,685
Patented Feb. 13, 1962

3,020,685
PROCESS AND APPARATUS FOR FILLING PRESSURE TIGHT CANS
Frank L. Kurek, 609 Charles Lane, Madison, Wis.
Filed Nov. 15, 1957, Ser. No. 696,687
7 Claims. (Cl. 53—7)

This invention relates to a process and apparatus for filling pressure tight cans.

One process utilized heretofore operated at room temperature however it was necessary to subject the materials of the process to pressure during the process and during filling of the aerosol containers. Another process utilized heretofore operated while the materials were maintained under pressure. The materials of the process were first subjected to pressure and then to refrigerating temperatures. The pressure was then removed and refrigeration was continued during the remainder of the process of filling of the aerosol containers.

Prior processes for filling pressure tight cans such as aerosol cans have consisted essentially of first cooling the liquid to be contained within the can and then metering the liquid while under refrigeration into the pressure tight cans by various types of volumetric fillers, usually of the piston type. This process has necessitated the filler operating at refrigerated temperatures and thus has created the problem of frost collection at the metering means. It has also created the problem of moisture absorption by the liquid due to exposure of the liquid to the atmosphere during the process.

Prior processes have also been unsatisfactory because of the very accurate temperature control which had to be maintained because of the sensitivity of the fillers to temperature changes.

The present invention relates to a new process and apparatus for filling pressure tight cans with refrigerated liquids in which the liquid is not exposed to the atmosphere after it is cooled except at the filling nozzle. It provides a process in which the filling of the receiver with liquid occurs at room temperature and occurs before the valve is attached to the receiver.

It also provides a process in which the temperature control of the cooling coil does not have to be precise but can vary considerably without affecting the fill weight. This is due to the fact that the product is metered at room temperature i.e., from 50° to 120° F. and that even though the volume contracts as it passes through the cooling coil, the same fill weight is discharged into the pressure tight can. By same fill weight, I mean that an equal amount is added to the container with each repeated operation. By metering, I mean that a predetermined amount of liquid is discharged into the apparatus with each repeated operation. By liquid, I mean a dispersion of concentrate i.e., active ingredient and propellant i.e., liquified gas, or concentrate alone, or liquid. If a dispersion of concentrate and propellant is used in the process, the supply tank is preferably pressurized. If concentrate alone is metered according to the process, propellant is preferably added thereafter followed by sealing.

The apparatus of the present process has only one moving part on the cold side of the apparatus and that is the check valve leading to the filling nozzle, thus the danger of frost collection at the metering means is removed.

It is therefore an object of the present invention to provide a new process and apparatus for filling pressure tight cans such as aerosol cans.

Another object is a process in which a liquid is metered first and then cooled.

Another object is a process for filling pressure tight cans in which the temperature control of the cooling coil does not need to be precise.

A still further object is a process for filling pressure tight cans such as aerosol cans in which the liquid is exposed to the atmosphere only at the filling nozzle.

Another object is an apparatus for filling pressure tight cans which has a driving means for propelling a liquid upstream of refrigerating means.

Another object is a process which provides low pressure at the outlet.

Another object is a process whereby aerosol cans may be filled before the valve is attached to said can.

Other objects will become apparent from the drawings and from the following detailed description in which it is my intention to illustrate the applicability of the invention without thereby limiting it to a scope less than that of all those equivalents which will be apparent to one skilled in the art and in which:

FIGURE 1 is an elevation of the apparatus used in carrying out the process of my invention; and FIGURE 2 is a schematic view of a valve being attached to the receiver after the receiver has been filled.

In FIGURE 1, a supply container for containing a liquid is connected by means of a conduit 2 having therein a valve 3, for example a check valve, to a metering device 4, and the metering device 4 is connected to a conduit 5 also having therein a valve 6, for example a check valve. The metering device 4 comprises a cylinder and a reciprocable piston 7 adapted to be reciprocated by a piston rod 8. When piston 7 is retracted in the cylinder, check valve 3 opens and a measured quantity of liquid enters the cylinder. When the piston 7 is urged forward in the cylinder, check valve 3 closes and check valve 6 opens permitting the flow of the measured quantity of liquid to be driven through cooling coil 9 cooled by refrigeration equipment having the general designation 10. Cooling coil 9 must be free of any pockets that may trap air or vapor and the coils must be fluid-filled. The air or vapor is preferably forced through the coil 9 and discharged through check valve 11 which opens on subjection to the pressure exerted by the metered liquid to permit the flow of the measured quantity of liquid to pass thru the multiple orifices contained in filling nozzle or outlet 12 into container 13 which then may have the valve attached therein as shown in FIGURE 2 by means of a valve attaching apparatus depending on the liquid being metered.

The process of my invention as carried out by the apparatus described in FIGURE 1 comprises the following sequential steps: Piston 7 is retracted in the metering cylinder and the metering cylinder is thereby filled with a measured quantity of liquid which enters through conduit 2 and check valve 3 from the supply container 1. The piston 7 is then moved forward in the metering cylinder causing the metered liquid to be expelled through conduit 5 and valve 6 to the cooling coil 9. The metered liquid moves upward through the cooling coil and then is forced through valve 11 and outlet 12 into container 13 for example an aerosol can. The container may then be sealed if a dispersion is being used or propellant may be added followed by sealing by attaching a valve 14 by means of the valve attaching apparatus shown in FIGURE 2 into the opening through which the fluid passed into receiver 13.

While the process and apparatus is suited for filling "pesticide aerosol" containers where a mixed charged of dichlorodifluoromethane, pyrethrum and sesame oil is to be packaged or where a charge of dichlorodifluoromethane is to be added to receivers already containing a mixture of pyrethrum and sesame oil, as well as for filling aerosol containers with cleaning solutions, perfume, hair lacquers, shaving cream, paint lacquers and household deodorant, the pressure tight containers may also be used to contain liquids such as orange juice or other liquids which are usually metered while under refrigeration.

By this process and apparatus, I may fill pressure tight cans with uniform weight amounts of liquid without exposure to the atmosphere except at the filling nozzle and without the problem of frost collection at the metering means.

It may thus be seen that the invention is broad in scope and includes such modifications as will be apparent to those skilled in the art and is to be limited only by the claims.

Having thus disclosed my invention, I claim:

1. A self contained process for transferring a concentrate from a supply tank to a receiver comprising the steps of supplying a concentrate to a metering pump, metering said concentrate, cooling said concentrate, supporting the receiver in connection with the outlet, filling a receiver with concentrate and subsequently sealing the receiver closed.

2. A self contained process for transferring a suspension of active ingredient and a propellant from a pressurized supply tank to a receiver comprising the steps of supplying a suspension of active ingredient and a propellant to a metering pump, metering said suspension, cooling said suspension and filling a receiver with said suspension and then sealing the receiver closed.

3. A self contained process for transferring a liquid from a supply tank to a receiver comprising the steps of supplying a liquid to a metering pump, simultaneously metering and cooling portions of said liquid and discharging portions of said liquid into a receiver containing active ingredient, thence sealing the receiver closed wherein an equal amount of liquid is cooled and discharged into said receiver.

4. A process as in claim 3 wherein said liquid is metered at room temperature.

5. A process as in claim 3 wherein said container is filled under atmospheric pressure.

6. In a self-contained system for transferring a liquid to a receiver comprising a supply tank, a metering pump, a first conduit having a valve therein connecting the tank to said metering pump, a regulatable cooling means, a second conduit having a valve therein connecting said metering pump to said regulatable cooling means, an outlet for discharging the liquid into said receiver, and a means for supporting said receiver in connection with said outlet.

7. In a self-contained system for transferring a liquid to a receiver comprising a supply tank, a metering device intermittently supplying liquid to said receiver from said supply tank, a first conduit having a valve therein connecting the tank to said metering device, a regulatable cooling means, a second conduit having a valve therein connecting said metering device to said regulatable cooling means, an outlet for discharging the liquid into said receiver, and a means for supporting said receiver in connection with said outlet.

References Cited in the file of this patent

UNITED STATES PATENTS

| | | |
|---|---|---|
| 1,207,133 | Byard | Dec. 5, 1916 |
| 2,536,322 | Smith | Jan. 2, 1951 |
| 2,659,215 | Massopust | Nov. 17, 1953 |
| 2,671,590 | McBean et al. | Mar. 9, 1954 |
| 2,684,805 | McBean | July 27, 1954 |
| 2,726,027 | North et al. | Dec. 6, 1955 |
| 2,779,357 | Stonestreet | Jan. 29, 1957 |
| 2,780,899 | Benson et al. | Feb. 12, 1957 |